March 29, 1932. B. W. NUTT 1,851,443
COMBINATION PROTECTIVE GOGGLES
Filed Dec. 24, 1927
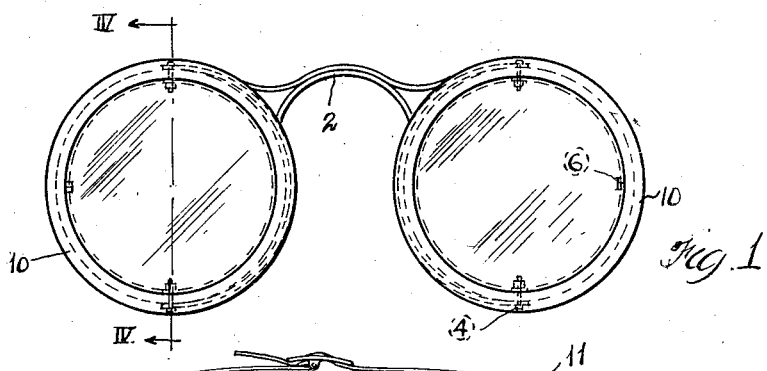
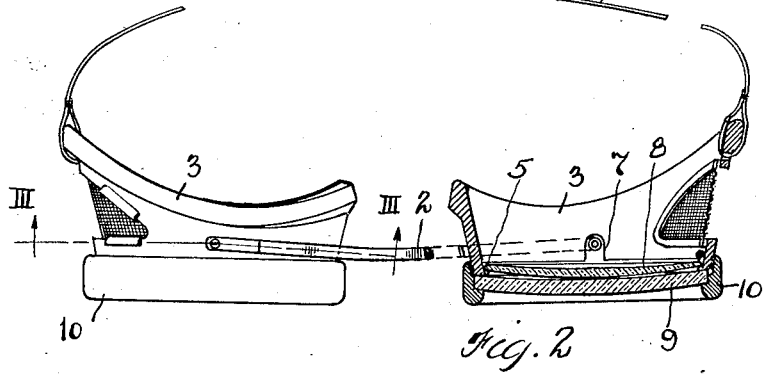
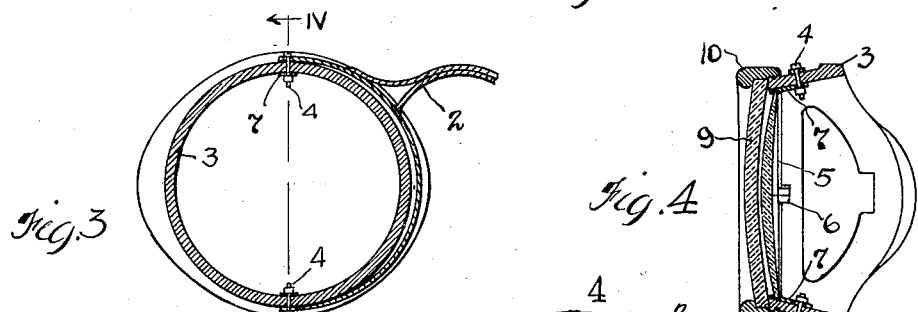
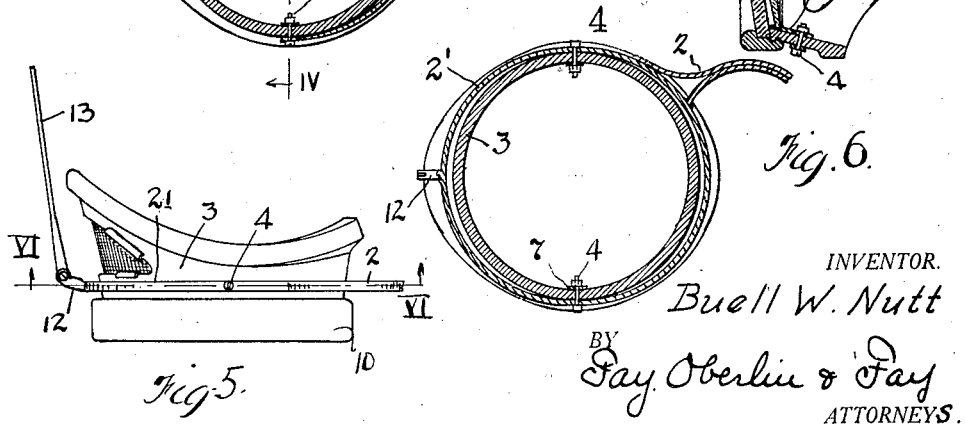
INVENTOR.
Buell W. Nutt
BY
Fay, Oberlin & Fay
ATTORNEYS.

Patented Mar. 29, 1932

1,851,443

UNITED STATES PATENT OFFICE

BUELL W. NUTT, OF LAKEWOOD, OHIO, ASSIGNOR TO THE SAFETY EQUIPMENT SERVICE COMPANY, OF CLEVELAND, OHIO, A CORPORATION OF OHIO

COMBINATION PROTECTIVE GOGGLES

Application filed December 24, 1927. Serial No. 242,425.

This invention relates to protective eye goggles, and more particularly goggles suitable for eyes which also require corrective lenses; and it is among the objects of the invention to provide a safe and accurate mounting for corrective lenses that may be required as well as the protective or filter glasses. A further object is an improved frame construction. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail certain structures embodying the invention, such being illustrative however of but a few of the various ways in which the principle of the invention may be employed.

In said annexed drawings:—

Fig. 1 is a front elevation of an embodiment of the invention; Fig. 2 is a plan view, half in section; Fig. 3 is a detail section taken on a plane indicated by the line III—III, Fig. 2; Fig. 4 is a section taken on a plane indicated by the line IV—IV, Fig. 3; Fig. 5 is a detail in plan showing a modification; and Fig. 6 is a sectional detail taken on a plane indicated by the line VI—VI, Fig. 5.

In its general aspects, the invention contemplates a frame, carrying lens-holding rings and protective-glass goggle cups. The frame includes a bridge 2 with arms extending thence laterally and to these in turn are attached goggle cups 3 of metal, composition, bakelite or other phenolic condensation product, rubber, celluloid, or other material as desired, preferably screws 4 being passed through the framing and the cups. Within each goggle cup is a lens-holding ring 5 having a split joint 6. While such ring may be held by shoulders or suitable locking means, I prefer to seat it in the cup toward the front, and further secure it against displacement by passing the screws 4 through lugs 7 extending rearwardly for that purpose. In this manner a secure anchorage of the lens ring may be had, and yet allow of disassemblage conveniently for the placement or change of a lens, the corrective lenses 8 requisite for any particular case being thus applied as in spectacle usage. The rings or ring grooves need not be limited to one, and a plurality of corrective lenses, or corrective and protective glasses may be readily mounted; and in some instances I may more simply hold the glasses by rings compressed or sweated into close frictional engagement. The protective or filter glass 9 may be positioned, as indicated, to the front of the corrective lens and may be secured in place by a screw-threaded ring 10 engageable with the goggle cup.

While in many instances, the goggles may desirably be held in position on the wearer's head by an adjustable headband 11, where corrective lenses of considerable particularity are required, I contemplate the application of temple bows, the framing being carried about the goggle cup to a lug-joint 12 to which the temple bow 13 (Fig. 5) may be secured.

It will thus be seen that corrective lenses may be accurately and conveniently carried in conjunction with protective or filter glasses and in a manner allowing of ready disassemblage for changes at any time and avoiding the handicap heretofore customary in the case of protective goggle users having inherent defects of vision.

Other modes of applying the principle of the invention may be employed, change being made as regards the details disclosed, provided the means stated in any of the following claims, or the equivalent of such, be employed.

I therefore particularly point out and distinctly claim as my invention:—

1. In a spectacle goggle, the combination of a frame, goggle-cups thereon, screws connecting the frame to the upper and lower sides of said cups, a lens-carrying ring within each cup, and top and bottom lugs extending rearwardly from said rings and engaged by said connecting screws.

2. In a spectacle goggle, the combination of a frame, goggle-cups thereon, screws connecting the frame to the upper and lower sides of said cups, a lens-carrying ring within each cup, top and bottom lugs extending rearwardly from said rings and engaged by said connecting screws, a protective glass for each cup, and a screw ring for retaining said protective glass.

3. In a spectacle goggle, the combination of a frame, goggle-cups thereon, said frame extending about said cups and having temple bows at the outer sides, screws connecting the frame to the upper and lower sides of said cups, a lens-carrying ring within each cup, and a protective glass in front of said lens-ring.

4. In a spectacle goggle, the combination of a frame, goggle-cups thereon, said frame extending about said cups and having temple bows at the outer sides, screws connecting the frame to the upper and lower sides of said cups, a lens-carrying ring within each cup, a protective glass in front of said lens-ring, and a screw ring for retaining said protective glass.

Signed by me this 22nd day of December, 1927.

BUELL W. NUTT.